United States Patent [19]

Hung

[11] Patent Number: 4,479,659

[45] Date of Patent: Oct. 30, 1984

[54] CYCLE

[76] Inventor: George H. C. Hung, 4 Seymour Rd., Block K, Merry Terrace, Hong Kong

[21] Appl. No.: 411,537

[22] Filed: Aug. 25, 1982

[30] Foreign Application Priority Data

Aug. 27, 1981 [GB] United Kingdom ............... 8126222

[51] Int. Cl.³ ............................................ B62M 1/20
[52] U.S. Cl. .............................. 280/226 R; 185/15.5
[58] Field of Search ............... 280/226 R, 226 A, 227, 280/228, 1.1, 1.1 A; 185/15.5

[56] References Cited

U.S. PATENT DOCUMENTS

| 496,800 | 5/1893 | Stamp | 185/15.5 X |
| 2,081,750 | 5/1937 | Laborda | 280/226 R X |
| 3,133,747 | 5/1964 | Nelson | 280/226 R |

FOREIGN PATENT DOCUMENTS

| 126539 | 5/1919 | United Kingdom | 280/226 R |
| 392051 | 9/1908 | France | 280/226 |
| 248369 | 2/1948 | Switzerland | 280/226 R |
| 8803 | of 1892 | United Kingdom | 280/226 R |
| 14943 | of 1895 | United Kingdom | 280/226 R |
| 373674 | 5/1907 | France | 280/226 R |
| 234363 | 5/1925 | United Kingdom | |
| 317983 | 7/1929 | United Kingdom | |
| 402369 | 11/1933 | United Kingdom | |
| 424566 | 2/1935 | United Kingdom | |
| 429460 | 5/1935 | United Kingdom | |
| 457307 | 11/1936 | United Kingdom | 280/226 R |
| 626900 | 7/1949 | United Kingdom | |

Primary Examiner—Joseph F. Peters, Jr.
Assistant Examiner—Mitchell J. Hill
Attorney, Agent, or Firm—Spencer & Frank

[57] ABSTRACT

A cycle, for example a bicycle, comprises a frame, a crossbar vertically pivotally mounted to the frame, a saddle fixed to the crossbar, a crank rotatably mounted on the frame, a mechanism for transmitting rotation of the crank to a drive wheel of the cycle, pedals rotatably provided on the crank for effecting rotation of the crank and a force transmission member for transmitting a force from the saddle to the crank, the force transmission member being pivoted to the crossbar for vertical movement in response to vertical pivotal movement of the crossbar, and to the crank for reciprocation of the force transmission member with rotation of the crank. Thus the cycle may be propelled by the application of a force to the saddle and the pedals alternately.

9 Claims, 5 Drawing Figures

CYCLE

BACKGROUND OF INVENTION

This invention relates to a cycle and, in particular, to a cycle wherein rotation of a drive wheel can be effected by the application of a force alternately to a pedal and to the or a saddle.

In a conventional bicycle, a drive wheel is adapted to be driven in rotation by means of a driven gear wheel, an endless chain and a driving gear wheel. The driving gear wheel is rotatable by means of two cranks having pedals rotatatably mounted thereon, the two cranks being mounted in opposition to one another. In use, a user may sit on a saddle of the bicycle and apply a force first to one pedal and then to the other, or the user may stand on the pedals and, by shifting his weight from one pedal to the other, effect rotation of the two cranks and thus of the driving gear wheel. A disadvantage of this arrangement is that the gear ratio between the driving gear wheel and the driven gear wheel, and thus the speed at which the bicycle can be propelled, is limited, because the maximum force which is applied to a pedal of the bicycle in use is generally somewhat less than the weight of the user. A further disadvantage is that the bicycle may be unsuitable for use by a disabled person, because two limbs are needed to operate the pedalling mechanism.

UK Patent Specification No. 234,363 describes a driving mechanism for a vehicle in which a pedal and a saddle are pivotally vertically movable and are interconnected by a pulley mechanism so that, in use, the rider's weight is applied alternately to the pedal and the saddle to effect periodic vertical movement of the saddle. The saddle is coupled via a pulley and spring mechanism to an axle of a drive wheel, which is also provided with a pawl and rachet mechanism to ensure that rotation of the axle occurs in one direction only. The drive wheel is driven only during upward movement of the saddle, which may limit the velocity which can be achieved, as well as, possibly, adversely affecting maneuverability. Furthermore, the various pulley and spring arrangements are complex and may be subject to early wear and damage.

UK Patent Specification No. 402,369 discloses a vehicle having a frame, a crossbar which is pivoted to the frame and has a saddle fixed thereto, a lever member pivoted to the frame, foot rests fixed to the lever member and crank means, similar to those of the conventional bicycle described above, rotatably mounted on the frame for transmitting rotation to a drive wheel of the vehicle. Each of the crossbar and the lever member is coupled to the crank means via a respective force transmission member which is vertically reciprocal with rotation of the crank means. Thus, rotation of the crank means is effected by the application of a substantially vertical force alternately to the saddle and the foot rests. This vehicle has a larger number of pivot points, which may detract from the mechanical strength of the vehicle and reduced the efficiency with which the weight of the user can be applied.

UK Patent Specification No. 424,566 discloses a similar arrangement in which the crank means is provided with a pair of off-set throws, one of which is linked to a lever member vertically pivoted to the frame and the other of which is linked to the foot reats, which are horizontally pivoted to the frane. Vertical movement of the lever member can either be effected by the application of the rider's weight to the saddle or by the restoring action of a tension spring. In addition to the disadvantages referred to above, the rider's full weight cannot be applied to the foot rests.

UK Patent Specification No. 457,307 discloses a bicycle in which both the saddle and a pedal crank axle are horizontally and vertically pivotal relative to the frame. The saddle is linked to the pedal crank via a force transmission member so as to effect rotation of the pedal crank in response to the application of the user's weight alternately to the saddle and to a pedal or pedals. However, movement of the saddle occurs both vertically and horizontally, leading to a reduction of efficiency. Also, the pedal crank may be limited in size, because it is not supported directly by the frame. The very large number of pivot points may render this device particularly vulnerable to mechanical stress.

UK Patent Specification No. 626,900 discloses a tricycle having two rear wheels with a common axle, in which a saddle is pivotable vertically with respect to the rear axle and a crank means, formed integrally with the rear axle, is rotatable in response to vertical movement of the saddle. Movement of the saddle in the upwards direction is effected by means of a pair of levers, each of which is provided at one end with a foot rest, pivoted at an intermediate point to a frame of the tricycle, and linked at its other end to the saddle via a link member. This arrangement suffers from a number of disadvantages. In particular, it is not possible for gearing to be provided, so that the velocities which can be achieved may be limited.

It is an object of the present invention to enable the provision of a cycle, for example, a bicycle, whereby the above disadvantages may be overcome, or at least mitigated.

SUMMARY OF INVENTION

According to the present invention there is provided a cycle which comprises rotatable crank means, at least one drive wheel rotatable in response to rotation of the crank means, the position of the axis of rotation of the crank means being fixed with respect to the drive wheel axle, pedal means mounted on the crank means for effecting rotation of the crank means, a saddle which is pivotally movable about a point, the position of which is fixed in relation to the drive wheel axle and means for transmitting a force from the saddle to the crank means to effect rotation of the crank means, whereby the cycle may be propelled by the application of a force alternately to the pedal means and to the saddle. The force transmitting means act on the crank means on one side of the axis of rotation of the crank means and the pedal means are mounted on the crank means on the other side of the last-mentioned axis or rotation.

The crank means may be integral with the drive wheel axle so as to effect rotation directly. However, it is preferred that rotation of the crank means be transmitted to the drive wheel axle via driving and driven gear wheels and an endless chain, so that a desired gear ratio may be selected. To this end, the cycle may comprise further, adjustable, gear means, as in a conventional bicycle.

The present invention enables the provision of a bicycle which can be propelled at a relatively high speed.

The present invention further enables the provision of a bicycle which may be suitable for use by a disabled person.

The present invention further enables the provision of a bicycle which is particularly suitable for use for exercise.

DESCRIPTION OF PREFERRED EMBODIMENTS

Figure 1:
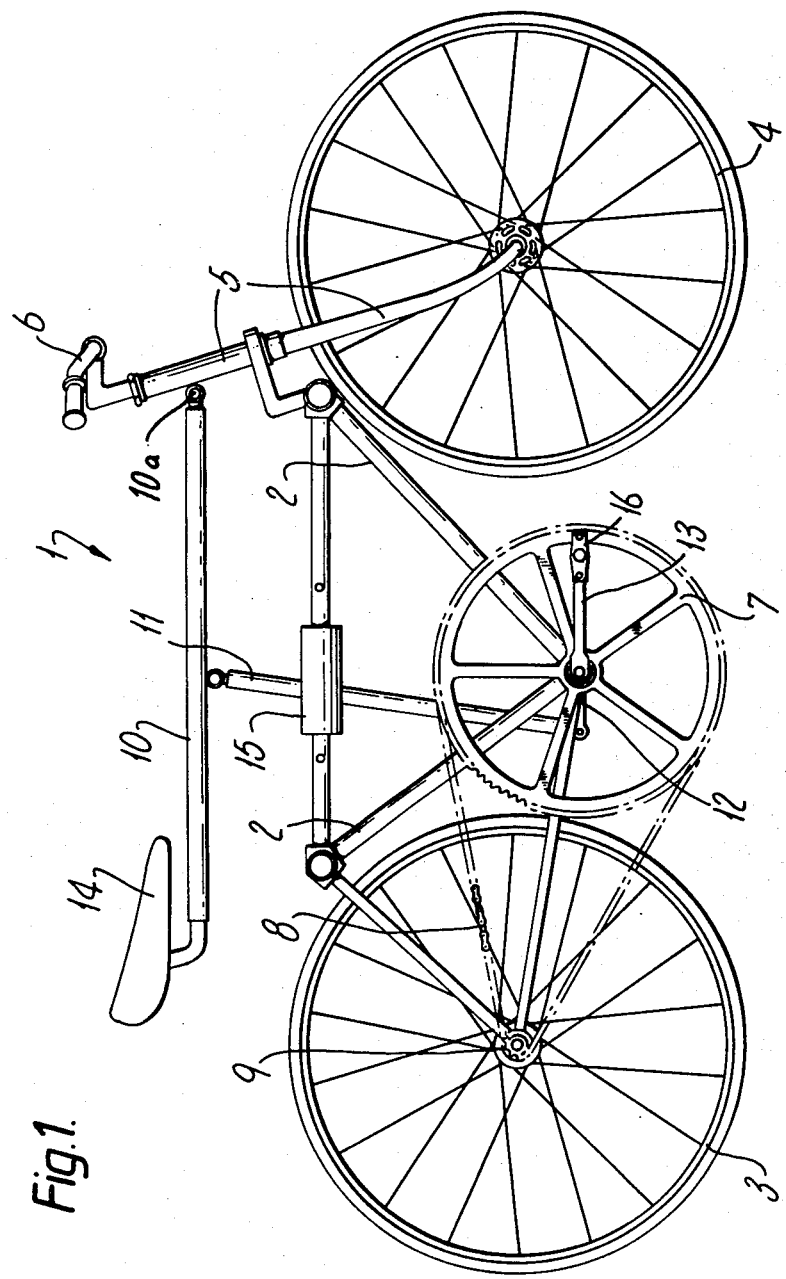
FIG. 1 shows a side elevational view of a bicycle embodying the present invention.
Figure 2:
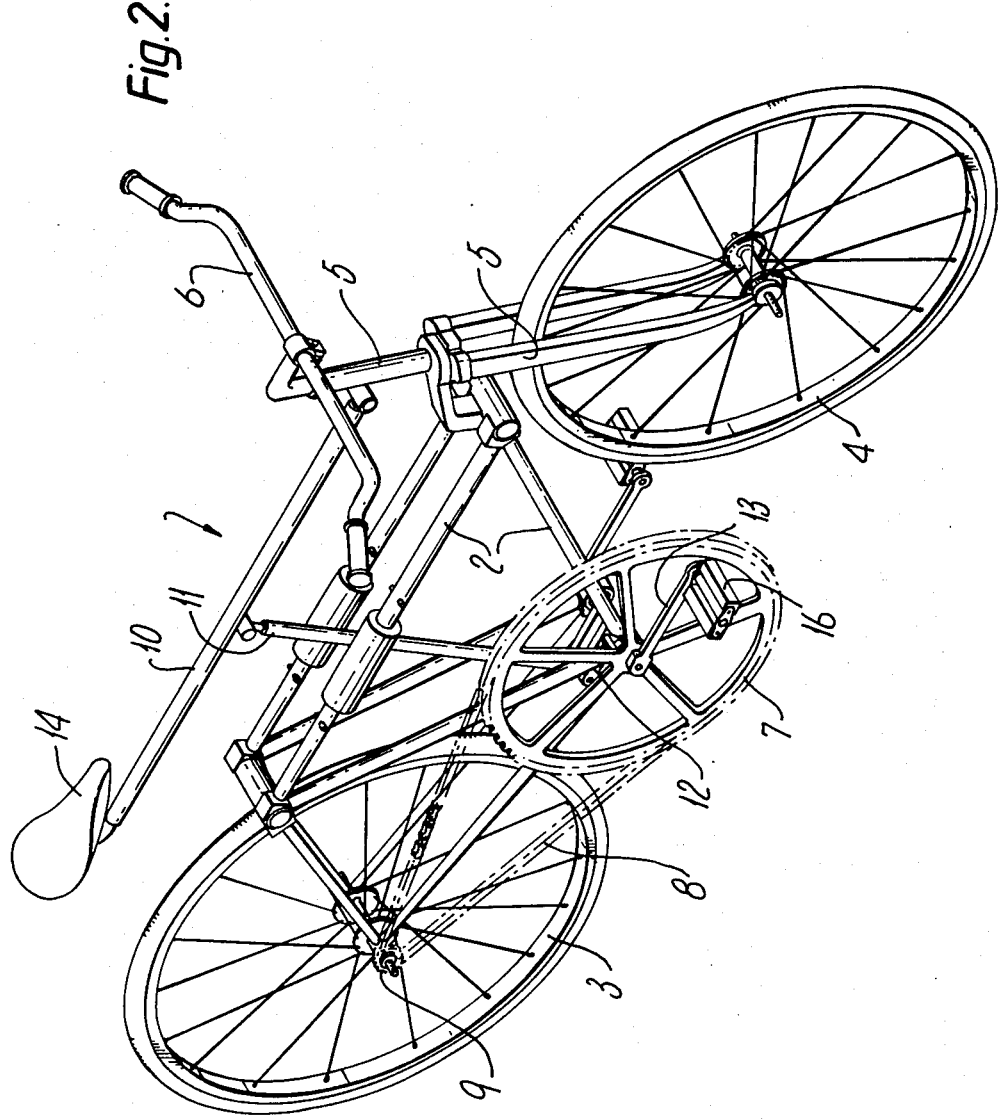
FIG. 2 shows a perspective view from above and to one side of the bicycle shown in FIG. 1.
Figure 3:
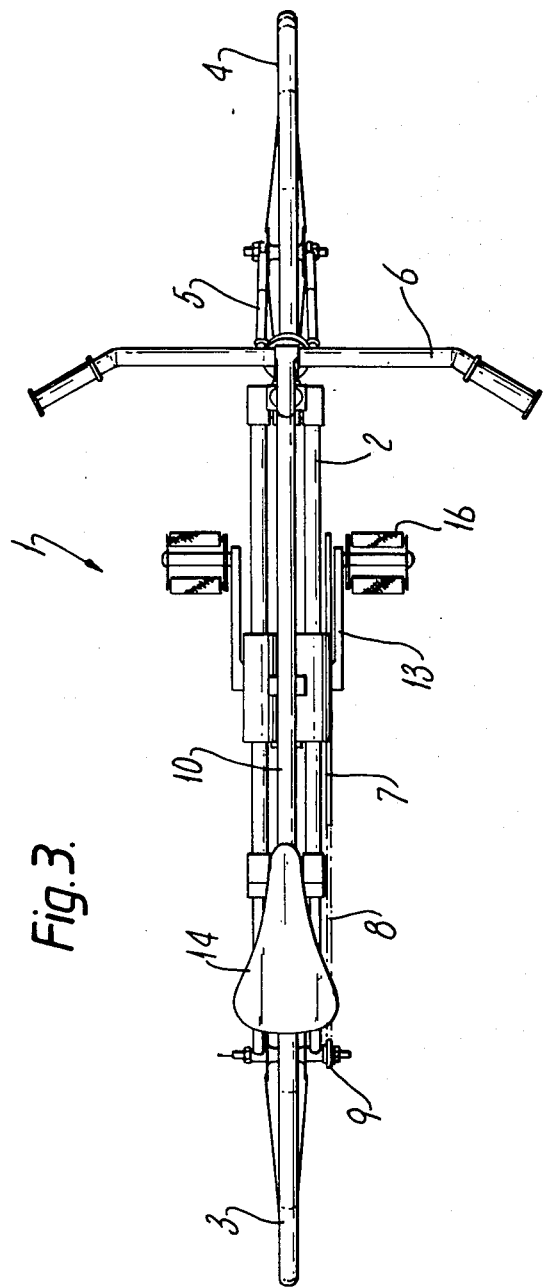
FIG. 3 shows a top plan of the bicycle shown in FIG. 1.
Figure 4:
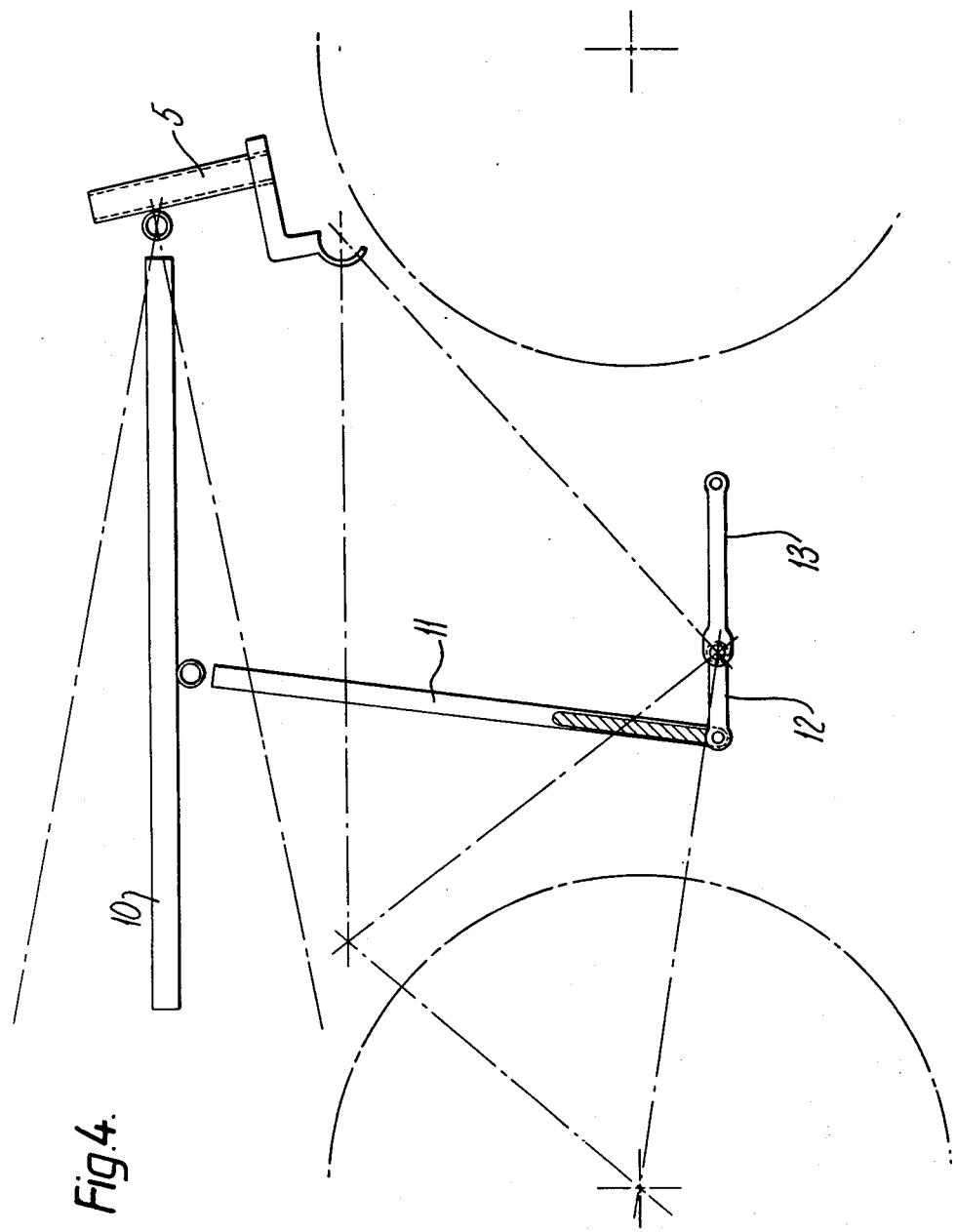
FIG. 4 shows a diagrammatic side view of a pedalling mechanism of the bicycle shown in FIG. 1.

Referring now to the drawings, there is shown a bicycle 1 comprising a main frame 2, a back wheel 3 and a front wheel 4. The front wheel 4 is freely rotatably mounted on a rigid member constituted by the front fork 5 of the bicycle which is rigidly connected to handle bars 6 of the bicycle for steering. The back wheel 3 is rotatably mounted on the main frame 2 and adapted to be driven in rotation by a toothed driving gear wheel 7, an endless chain 8 and a toothed driven gear wheel 9. Of course, the bicycle may comprise further gear means as in a conventional bicycle, to enable a user to cycle up and down hills. In one aspect of the invention, double stage gearing may be provided. The back wheel 3 is provided with a conventional freewheel mechanism so that the back wheel 3 may be freely rotated whilst the driving gear wheel 7, the endless chain 8 and the driven gear wheel 9, remain stationary. The driving gear wheel 7 is rotatably mounted on the main frame 2 for rotation about a drive wheel axle and is adapted to be driven in rotation by a pedalling mechanism which comprises a crossbar 10, a force transmission member 11, crank means constituted by cranks 12 and pedal cranks 13. The crank means are rotatable about an axis of rotation. The crossbar 10 is pivotally attached at a pivot point 10a to the front fork 5 so as to be capable of being pivoted about a pivot axis and has a saddle 14 mounted thereon. The force transmission member 11 is pivotally connected to a midportion of the crossbar 10 and is adapted to be driven by rotation of the cranks 12 in a vertical plane. Bush bearings 15 prevent extensive movement of the force transmission member 11 and thus of the crossbar 10 from side to side during use of the bicycle. Each of the cranks 12 is pivotally attached to the force transmission member 11 for movement about a pivot axis which is remote from and parallel to the axis of rotation of the crank means, and, together with the associated pedal crank 13, acts as a single rigid member rotatable 360° about the rotation axis of the driving gear wheel 7. One of the cranks 12 and the association pedal crank 13 are attached to the driving gear wheel 7 so that rotation of the cranks 12 and the pedal cranks 13 in a forward direction causes rotation of the driving gear wheel 7. Each pedal crank 13 is provided with a pedal 16 rotatably mounted thereon about an axis of rotation. As is clearlyshown in the drawing, the force transmitting means act on the crank means on one side of the axis of rotation of the crank means and the pedal means are mounted on the crank means on the other side of the last-mentioned axis of rotation.

Figure 5:
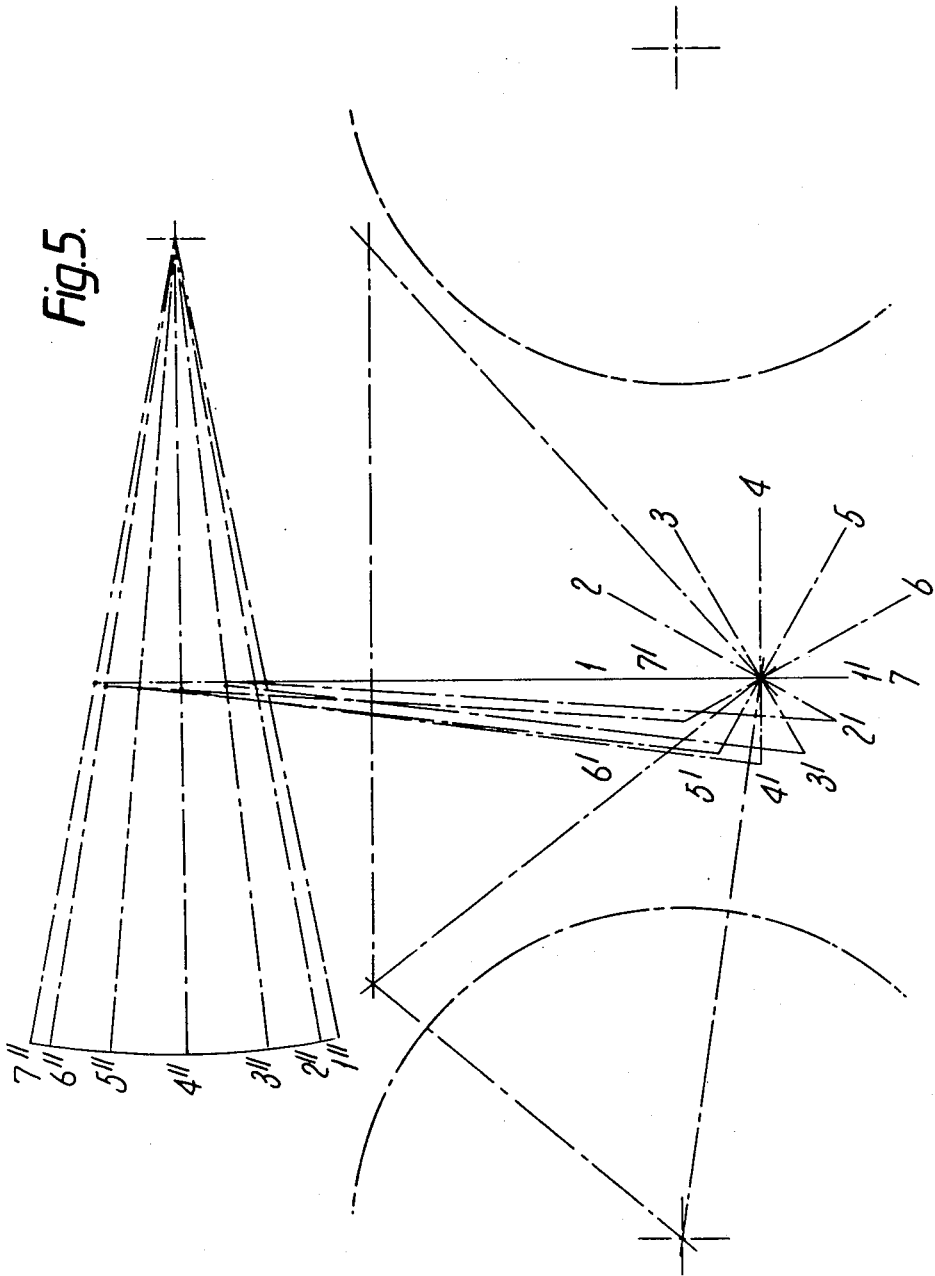
FIG. 5 is a diagram showing the positions, in use of a pedal crank, a crank and a crossbar of the pedalling mechanism shown in FIG. 4.

To operate the bicycle, the pedals 16 may be moved to the highest angular position thereof, and a force applied thereto to cause the pedal cranks 13, the cranks 12 and the driving gear wheel 7 to rotate in a forward direction and the force transmission member 11 and crossbar 10 to move upwards. When the pedals 16 have reached the lowest angular position thereof, the crossbar 10 being then at the highest position thereof, the weight of a user seated on the saddle 14 acts to push the force transmission member 11 downwards, causing continued rotation of the cranks 12, the pedal cranks 13 and the driving gear wheel 7 until the pedals reach the highest angular position thereof, the crossbar 10 being then at the lowest position thereof. That is to say, the parts are arranged such that continued rotation of the crank, and consequently of the driving gear wheel 7, may be effected by the application of a force alternately to the pedals and the saddle. The relative positions, in use, of a pedal crank 13, associated crank 12 and the crossbar 10 are further illustrated in FIG. 5 of the drawings, designated by the numerals 1 to 7, 1' to 7' and 1" to 7", respectively.

In use, the bicycle may be mounted as described above. Alternately, a user may stand on one pedal, the pedal 16 being at the lowest angular position thereof, and propel the bicycle forward, thereafter seating himself on the saddle 14 to cause the cranks 12, pedal cranks 13 and the driving gear wheel 7 to start rotating.

It is to be noted that the gear ratio between the driving gear wheel 7 and the driven gear wheel 9 is high. This ratio may be as high as 20:1 or 30:1, and may be achieved either by providing a large driving gear wheel 7 as shown or by providing internal gearing in a hub of the back wheel 3. This is possible because the full weight of the user is utilized in operation of the bicycle, and enables the bicycle to move rapidly in use. The gear ratio may be chosen such that, when the bicycle is travelling at a moderate speed, rotation of the driving gear wheel 7 occurs between about ten and twenty times per minute so as to approximate to the frequency of respiration of a user. It is to be further noted that, in use, the pedals 16 are moved synchronously and the distance between the saddle 14 and the pedals 16 varies periodically. Thus, the bicycle is particularly suitable for use for exercise.

The effective turning force exerted on the cranks 12 and 13 during downward movement of the pedals 16 may be enhanced by providing a harness which is attached to the saddle 14 and passes round the waist and/or thighs of the user so that he/she can pull upwardly on the saddle 14 whilst pressing downwardly on the pedals 16 with his/her feet.

As will be apparent from the above description and the accompanying drawings, only one pedal 16 of the bicycle need be operated to propel the bicycle. In an alternative embodiment of the invention only one pedal 16 and one pedal crank 13 are provided. Thus, the present invention enables the provision of a bicycle which may be suitable for use by a disabled person.

In a further alternative embodiment of the invention, means are provided whereby the moment exerted on the cranks 12 by the application of the weight of a user to the saddle 14 can be varied. For example, the position of the saddle 14 on the crossbar 10 may be adjustable, or the saddle 14 may be replaced by an elongate seat mounted on and parallel with the crossbar 10, so that the weight of the user can be applied at a variable distance from the pivotal connection between the crossbar 10 and the force transmission member 11. Thus, the present invention enables the provision of a bicycle which may be suitable for use by persons of various weights and heights.

The invention has been described with reference to a bicycle suitable for use by one person. However, a cycle in accordance with the invention may comprise any number of wheels including, for example, more than one drive wheel mounted on the same wheel axle or driven by a common gear mechanism. The cycle may also comprise a number of saddles, each provided with a pedalling mechanism and driving gear wheel linked to a respective or common drive wheel via a freewheel mechanism. Means for carrying a passenger, such as a saddle or seat fixed to the frame, may also be provided.

What is claimed is:

1. A cycle which comprises rotatable crank means having an axis of rotation, a drive wheel axle, at least one drive wheel rotatable in response to rotation of the crank means, the position of the axis of rotation of the crank means being fixed with respect to the drive wheel axle, pedal means mounted on the crank means for effecting rotation of the crank means, a saddle which is pivotally movable about a pivot point, the position of which is fixed in relation to the drive wheel axle, and means for transmitting a force from the saddle to the crank means to effect rotation of the crank means such that continued rotation of the crank means may be effected by the application of a force alternately to the pedal means and to the saddle, said force transmitting means acting on said crank means on one side of the axis of rotation of said crank means and said pedal means being mounted on said crank means on the other side of said last-mentioned axis of rotation.

2. A cycle according to claim 1, wherein the means for transmitting a force from the saddle to the crank means comprises a force transmission member which is pivoted to the crank means about a pivot axis which is remote from and parallel to the axis of rotation of the crank means.

3. A cycle according to claim 2, wherein the means for transmitting a force from the saddle to the crank means further comprises a crossbar which is pivotally movable about said pivot point, the position of which is fixed with respect to the drive wheel axle, the saddle being mounted on the crossbar and the force transmission member being pivoted to the crossbar for movement in response to pivotal movement of the crossbar.

4. A cycle according to claim 3, which cycle is provided with steering means comprising a rigid member and a driven wheel rotatably mounted on the rigid member, the rigid member being pivotally movable with respect to the drive wheel axle, wherein the crossbar is pivoted to the rigid member, said pivot point, the position of which is fixed with respect to the drive wheel axle, being located on the pivot axis of the rigid member.

5. A cycle according to claim 1, wherein the pedal means is rotatably mounted on the crank means, the axis of rotation of the pedal means relative to the crank means being parallel to and spaced from the axis of rotation of the crank means.

6. A cycle according to claim 5, wherein the means for transmitting a force from the saddle to the crank means comprises a force transmission member which is pivoted to the crank means about a pivot axis which is remote from and parallel to the axis of rotation of the crank means, and the axis of rotation of the crank means lies between said axis of rotation of the pedal means and said pivot axis of the force transmission member.

7. A cycle according to claim 1, which cycle is provided with steering means comprising a rigid member and a driven wheel rotatably mounted on the rigid member, the rigid member being pivotally movable with respect to the drive wheel axle.

8. A cycle according to claim 1, which comprises a toothed driving wheel, and endless chain comprising a plurality of links and a toothed driven wheel, the toothed driving wheel and the toothed driven wheel engaging the links of the endless chain, for transmitting rotation of the crank means to the drive wheel.

9. A cycle which comprises a frame, a drive wheel rotatably mounted on the frame, a crank means rotatably mounted on the frame for rotation about an axis of rotation, a toothed driving wheel secured to the crank means for rotation therewith, a toothed driven wheel secured to the drive wheel for rotation therewith, the axis of rotation of the crank means and the toothed driving wheel being remote from and parallel to the axis of rotation of the drive wheel and the toothed driven wheel, an endless chain having links for engaging the toothed driving wheel and the toothed driven wheel, a front fork member pivotally mounted to the frame about a pivot axis, a driven wheel rotatably mounted in the front fork member, handle bars secured to the front fork member, a crossbar pivotally mounted to the front fork member for vertical pivotal movement about a pivot point on the pivot axis of the front fork member, a saddle secured to the crossbar, a force transmission member having first and second ends, the first end being pivoted to the crossbar and the second end being pivoted to the crank means about a pivot axis which is remote from and parallel to the axis of rotation of the crank means, two pedals which are rotatably mounted on the crank means and have a common axis of rotation which is parallel to, and remote from, said axis of rotation of the crank means, said axis of rotation of the crank means lying between said pivot axis of the force transmission member and said common axis of rotation of the two pedals such that continued rotation of the crank means may be effected by the application of a force alternately to the pedal means and to the saddle, said force transmitting means acting on said crank means on one side of the axis of rotation of said crank means and said pedal means being mounted on said crank means on the other side of said last-mentioned axis of rotation, and bush bearings provided on the frame for preventing side to side movement of the force transmission member and the crossbar.

* * * * *